A. VERBECK.

Improvement in Grinding-Mills.

No. 5,056. Reissued Sep. 10, 1872.

Witnesses.

J. M. Pattuson

Adam Smith

Inventor.

Amos Verbeck.

AM. PHOTO-LITHOGRAPHIC CO. N.Y. (OSBORNE'S PROCESS.)

UNITED STATES PATENT OFFICE.

AMOS VERBECK, OF STERLING, ILLINOIS, ASSIGNOR, BY MESNE ASSIGNMENTS, TO SAMUEL WELLS.

IMPROVEMENT IN GRINDING-MILLS.

Specification forming part of Letters Patent No. 107,640, dated September 20, 1870; reissue No. 5,056, dated September 10, 1872.

Specification describing certain Improvements in Grinding-Mills, invented by AMOS VERBECK, of Sterling, in the county of Whitesides and State of Illinois.

My invention relates to the construction and arrangement of a grinding-mill, to be attached to an ordinary hand or horse corn-sheller or other suitable machinery; the object being to provide a cheap and speedy method of grinding corn, oats, and other grain for stock and for domestic use.

Figure 1:
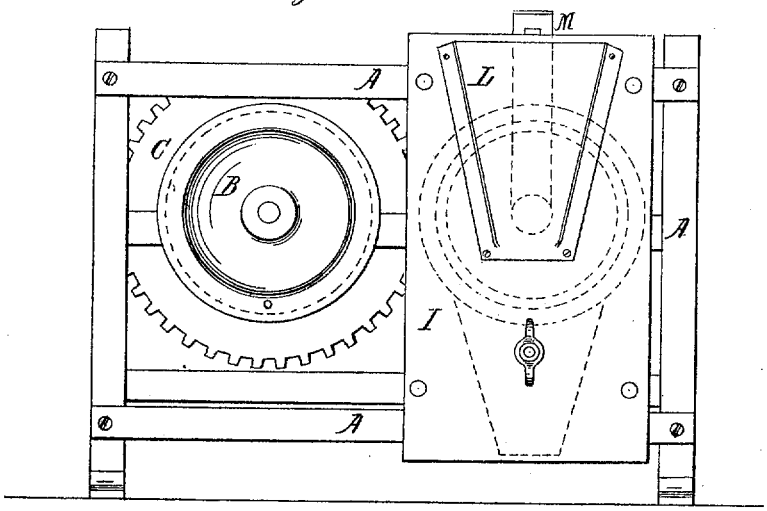
Figure 2:
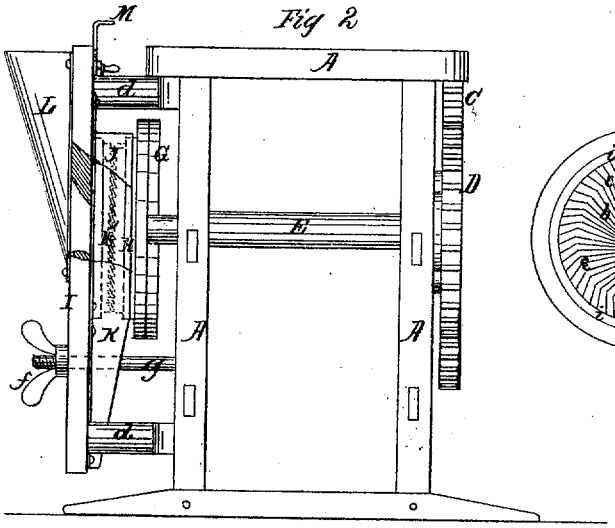
Figure 3:
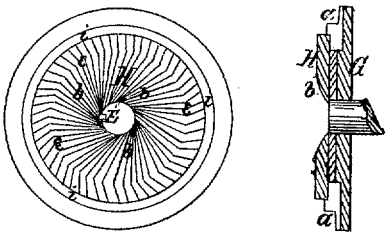

Figure 1 is a side elevation of a machine embodying my invention. Fig. 2 is an end view of the same. Fig. 3 shows the grinding-face of the burrs used, and the mode of cutting and attaching the burrs.

A represents the frame of my machine. B is the driving-wheel, mounted upon one end of a horizontal shaft, which has its bearings in the frame A, and upon the other end of which is a large cog-wheel, C. This wheel gears with another wheel, D, upon one end of a similar shaft, E. On the other end of the shaft E is a disk, G, having a circular recess, in which the burr H is inserted. This burr is fastened by means of two blocks, *a a*, secured on the under or inner side of the burr and let into the flange surrounding the recess on the disk G, as shown in Fig. 3. The grinding-face of the burr H is provided with furrows and grinding-ridges, as shown in Fig. 3. These grinding-ridges extend from the circumference of the hole in the center of said burr, as shown at E, to the circumference of the burr. These ridges are made with an obtuse angle therein at a point about one-quarter of an inch from the outer circumference of the burr, as shown at *e* in Fig. 3.

The grinding-ridges in such burrs being heretofore in direct or slightly-curved lines, the grain was allowed to pass through the furrows between such ridges with comparatively little change of position; and as the more different positions the grain assumes while between the burrs the finer it is ground, the advantage of the angles is this: The grain, proceeding in the furrows from the inner toward the outer circumference of the burr, on reaching *e* is changed in position by meeting these angles in the ridges at *e*, and is thus more finely ground.

The blocks *a a* are cast with and form part of the burr. The surface from *e* to *i* is flat, although furrowed, but from *e* inward to the shaft it bevels inward and the central edge is curved or rounded. Near the inner edge of the burr is a series of projecting teeth, *b*. From the side of the frame A, above and below the burr H, project four arms, *d d*, having tenons on their outer ends, and on said tenons is placed a plate, I, provided on its inner side with a stationary burr, H′, constructed and attached in the same manner as above described for the revolving burr H. Around this burr is a circular casing, J, with delivery-spout K underneath, the casing being large enough to inclose the revolving burr H also when put in place. On the outside of the plate I is a hopper, L, through which the grain is fed to the mill, said hopper opening in the center of the stationary burr H′; and on the inside of the plate I is a slide, M, running behind said burr and projecting into the central opening to regulate the amount of grain fed to the hopper. A screw-bolt, *g*, is attached to the frame A immediately under the disk G, and passes through the face-plate I. On the outer end of this screw-bolt is a thumb-nut, *f*, by means of which the burrs may be regulated to grind fine or coarse, as may be desired.

Having thus fully described my invention, what I claim as new, and desire to secure by Letters Patent, is—

1. The arrangement, upon the face-plate I, of the stationary burr H′, casing J, spout K, hopper L, and slide M, all constructed and operating as set forth.

2. In combination with plate I and devices thereto attached, the screw-bolt *g* and thumb-nut *f*, all arranged and operating as described.

3. I also claim the burrs H and H′, in combination with the blocks *a a*, as and for the purpose set forth.

Witnesses: AMOS VERBECK.
J. M. PATTERSON,
ADAM SMITH.